Jan. 19, 1960    E. J. SCHULENBURG    2,922,057
INDUCTION DISC MOTOR
Filed Aug. 6, 1957    2 Sheets-Sheet 1
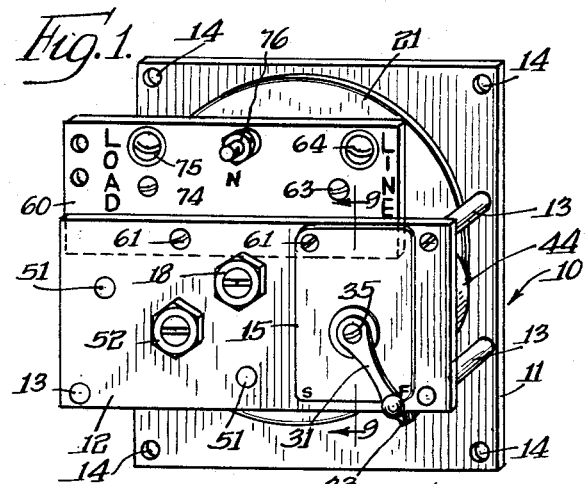
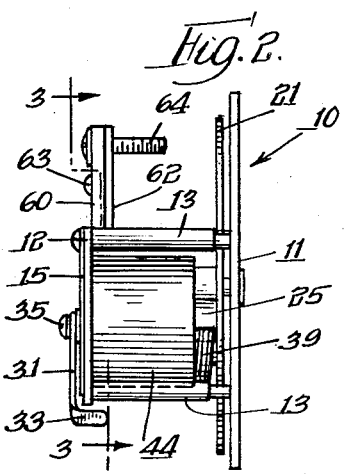
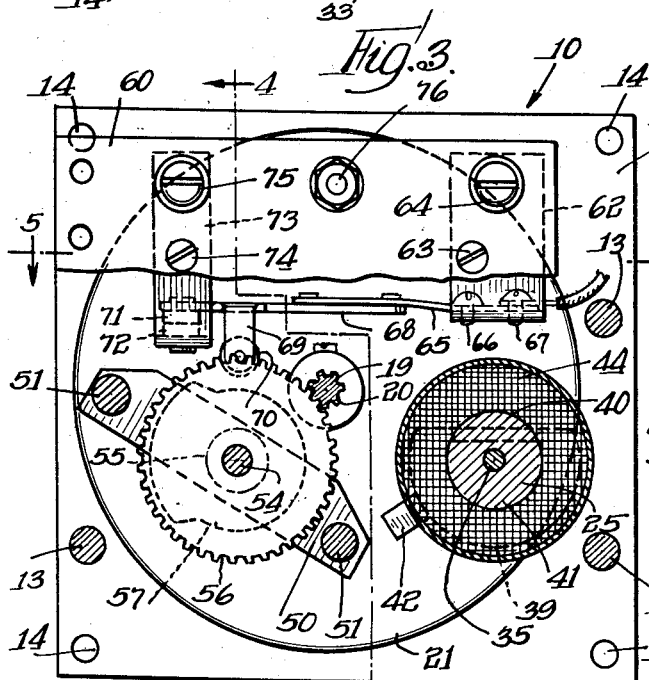
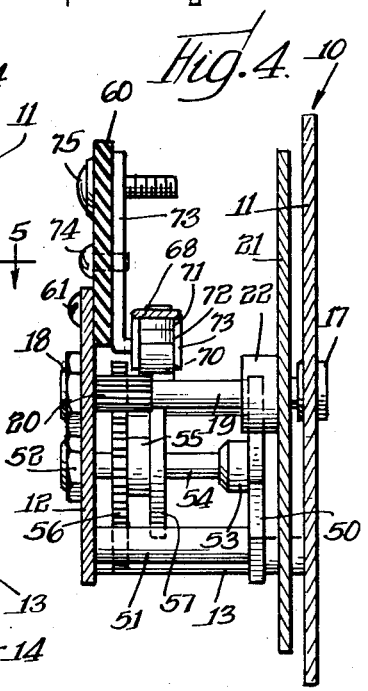
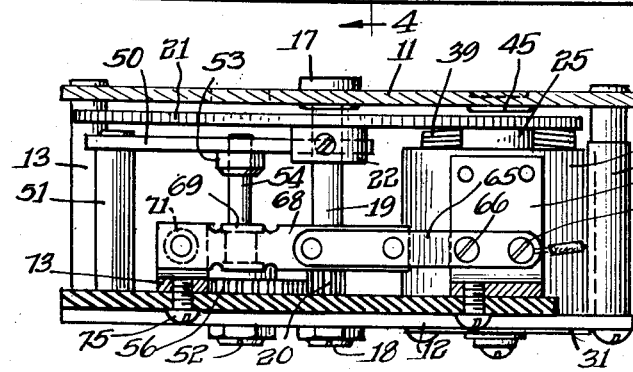
INVENTOR.
Edward J. Schulenburg
BY
Wallenstein & Spangenberg
Att'ys

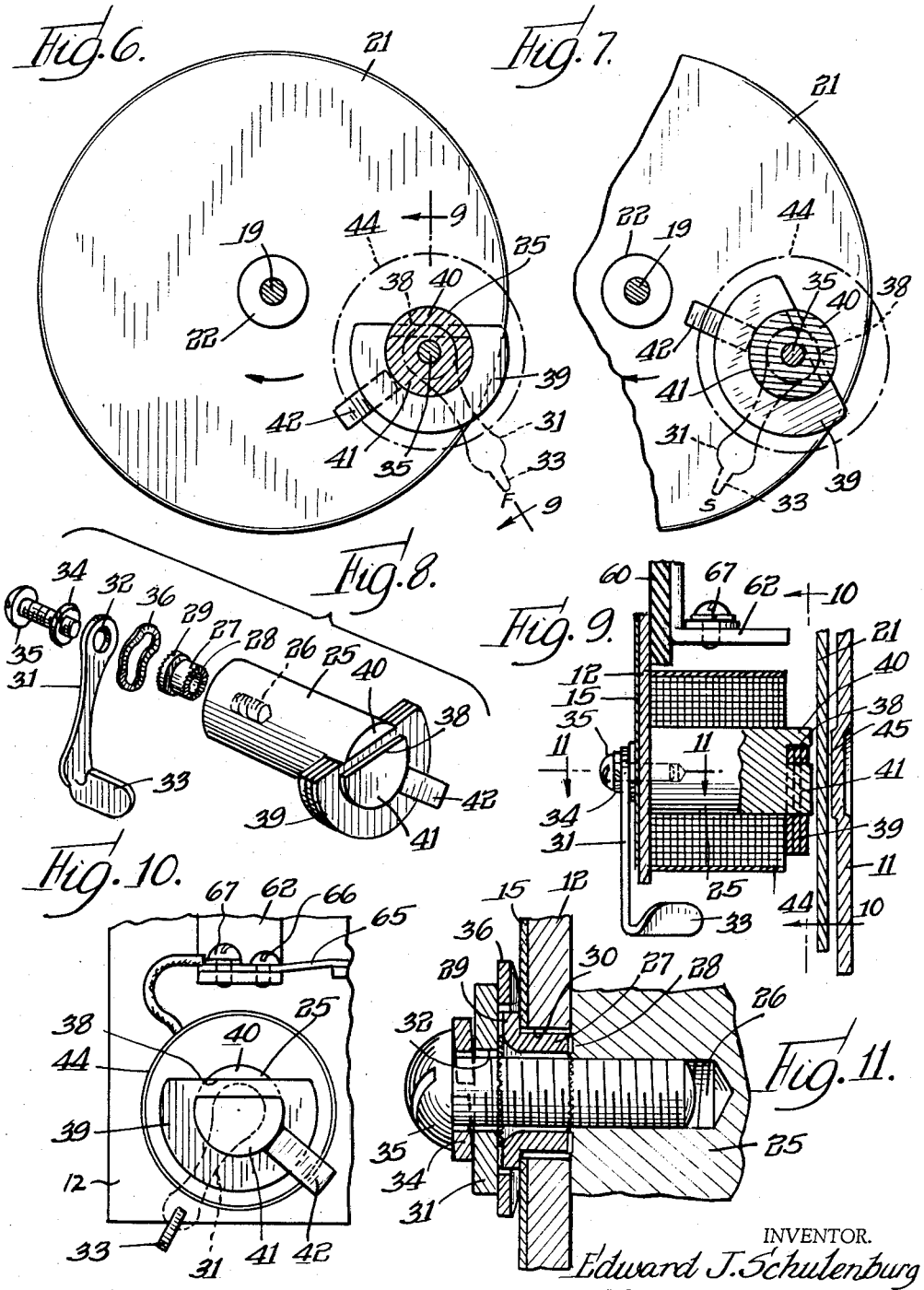

United States Patent Office 2,922,057
Patented Jan. 19, 1960

2,922,057

INDUCTION DISC MOTOR

Edward J. Schulenburg, Danville, Ill.

Application August 6, 1957, Serial No. 676,663

6 Claims. (Cl. 310—172)

This invention relates to induction disc motors and more particularly to such motors which are useful in operating switches or the like for electrical control purposes, such as for example, a flasher control for electric signs and the like.

The principal object of this invention is to provide a variable speed single phase induction disc motor wherein the torque and speed characteristics of the motor are considerably enhanced and wherein the speed of rotation of the motor may be positively and accurately adjusted.

Briefly, the variable speed single phase induction disc motor of the invention comprises a rotatably mounted non-magnetic metallic induction disc, and a field structure for the induction disc including a magnetically permeable metallic core arranged perpendicularly to the disc with its inner end adjacent the disc and including an exciting coil arranged around the core for producing an alternating flux in the core. The frame for the motor may also form a portion of the field structure for completing the flux path. The inner end of the core, adjacent the disc, is provided with a transverse slot, and a non-magnetic metallic phasing or shading ring is secured within the slot and encompasses a portion of the inner end of the core to form an unshaded pole portion and a shaded pole portion thereon for producing a rotating field for rotating the induction disc.

A magnetically permeable metallic extension piece extends from the shaded pole portion beyond the shading ring and parallel to the induction disc for increasing the torque and speed of rotation of the induction disc, thereby enhancing the torque and speed characteristics of the motor. Preferably, this extension piece is in the form of a strip which is longer than it is wide, the strip extending lengthwise substantially radially from the shaded pole portion and at an angle with respect to the slot for the shading ring. It is believed that this extension piece operates electrically to space farther apart the shaded and unshaded pole portions to provide the improved torque and speed characteristics of the motor without a corresponding increase in electrical input to the motor.

Means are also provided for adjustably mounting the core for rotatable adjustment about its perpendicular axis for rotatably positioning the unshaded pole portion, the shaded pole portion and the extension piece with respect to the axis of rotation of the induction disc for regulating the speed of rotation of the induction disc. In this respect, the core is preferably rotatably positioned between a position for providing maximum speed where a line through the slot extends to one side of the axis of rotation of the induction disc and the extension strip is substantially tangential to a circle having its center at the axis of rotation of the induction disc, and a position for providing minimum speed where a line through the slot extends to the other side of the axis of rotation of the induction disc and the extension strip is substantially radial with respect to the axis of rotation of the induction disc. It is believed that this rotatable adjustment of the unshaded pole portion, the shaded pole and the extension strip operates to change the direction of the flux force applied to the induction disc and mechanically to change the spacing between the shaded and unshaded pole portions with respect to the tangent of a circle having its center at the axis of rotation of the induction disc, this, therefore, adjustably changing the torque and speed of rotation of the induction disc.

Further objects of this invention reside in the details of construction of the induction disc motor and in the cooperative relationships between the component parts thereof.

Other objects and advantages of this invention will become apparent to those skilled in the art upon reference to the accompanying specification, claims and drawings, in which:

Fig. 1 is a front perspective view of the induction disc motor of this invention and illustrating the motor as operating a switch for electrical control purposes.

Fig. 2 is a side elevational view looking from the right of Fig. 1.

Fig. 3 is a front elevational view of the induction disc motor with a portion thereof shown in section, taken substantially along the line 3—3 of Fig. 2.

Fig. 4 is a horizontal sectional view taken substantially along the line 4—4 of Fig. 3.

Fig. 5 is a horizontal sectional view taken substantially along the line 5—5 of Fig. 3.

Fig. 6 is a view illustrating the rotative position of the core with respect to the induction disc for providing maximum speed.

Fig. 7 is a view similar to Fig. 6 but showing the relative positions of the parts for providing minimum speed.

Fig. 8 is an exploded perspective view of the core and the means for rotatably positioning the same.

Fig. 9 is a vertical sectional view through the field structure taken substantially along the line 9—9 of Fig. 1.

Fig. 10 is a sectional view taken substantially along the line 10—10 of Fig. 9.

Fig. 11 is a sectional view taken substantially along the line of 11—11 of Fig. 9.

The induction disc motor of this invention is generally designated at 10 and it includes a magnetically permeable frame consisting of a back plate 11 and a front plate 12 which are secured together in parallel spaced apart relation by spacers 13. The back plate 11 is provided with holes 14 for purposes of mounting the motor. The front plate 12 preferably carries a name plate 15. The back plate 12 is provided with a bearing 17 and the front plate 12 is provided with a bearing 18 in alignment with the bearing 17. A shaft 19 is rotatably mounted in the bearings 17 and 18 between the plates 11 and 12. Adjacent the front plate 12, the shaft 19 is provided with pinion gear teeth 20. A non-magnetic metallic disc 21, formed from any suitable material such as copper, aluminum or the like, is secured to the shaft 19 by a collar 22, the disc 21 being arranged closely adjacent the back plate 11. The disc 21 forms a rotatable induction disc.

Arranged between the induction disc 21 and the front plate 12 is a core 25 formed from magnetically permeable material. This core 25 is preferably cylindrical in configuration and is held at one end against the front plate 12. At its inner end the core 25 lies closely adjacent to the induction disc 21. As shown more clearly in Figs. 8 to 11, the outer end of the core 25 is provided with a tapped hole 26 for the purpose of adjustably securing the core 25 to the front plate 12 with the longitudinal axis of the core 25 perpendicular to the induction disc 21. The front plate 12 and name plate 15 are provided with a hole 30 which receives a flanged sleeve 27. The inner end of the sleeve 27 is serrated as indicated at 28 and digs into the outer end of the core to form a rigid connection therebetween. The flanged end of the sleeve 27 is also serrated as indicated at 29 for engaging and digging into a lever 31 about a hole 32 therein for rigidly securing the lever 31 and the sleeve 27 together. The free end of the lever 31 is provided with a handle 33 for rotating the same. A lock washer 34 is interposed between the lever 31 and the head of a screw 35 which is screwed into the tapped hole 26. When the screw 35 is tightened the handle 31 is secured to the core 25 through the flanged sleeve 27 so that as the handle 31 is rotatably positioned the core 25 is correspondingly rotatably positioned. The sleeve 27 rotates within the hole 30 in the front plate 12 and name plate 15. A spring washer 36 is interposed between the lever 31 and the name plate 15 for holding the outer end of the core 25 against the front plate 12 and for frictionally holding the core 25 in any of its rotatably adjusted positions.

The inner end of the core 25 adjacent the induction disc 21 is provided with a transverse slot 38. A non-magnetic metallic shading ring 39 is secured within the slot 38 and encompasses a portion of the inner end of the core 35 to form an unshaded pole portion 40 and a shaded pole portion 41 thereon. The shading ring 39 may be made of several rings as illustrated, these rings being formed from copper or the like. The shading ring 39 causes the flux in the shaded pole 41 to lag the flux in the unshaded pole portion 40 so as to produce a rotating field for rotating the induction disc 21 as indicated by the arrows in Figs. 6 and 7. Fig. 6 illustrates the rotative position of the core 25 with respect to the axis of rotation of the induction disc 21 for producing maximum torque and speed of rotation of the induction disc. It is here noted that a line through the slot 38 extends to one side of the axis of rotation of the induction disc. A magnetically permeable metallic extension piece 42 extends from the shaded pole portion 41 beyond the shading ring 39 and parallel to the induction disc 21. This extension piece 42 is preferably in the form of an extension strip which is longer than its side, the strip 42 extending lengthwise substantially radially from the shaded pole 41. The extension piece may be secured in place by soldering the same to the shading ring 39. With the parts in the position illustrated in Fig. 6 for providing maximum speed for rotation, the extension strip 42 is arranged substantially tangential to a circle having its center at the axis of rotation of the induction disc 21. This magnetically permeable metallic extension strip 42 operates to increase the torque and speed of rotation of the induction disc and in this respect it is believed that this extension strip operates electrically to space farther apart the shaded and unshaded pole portions to provide the improved torque and speed characteristics of the motor without a corresponding increase in electrical input to the motor.

When the core 25 is rotated to the position illustrated in Fig. 7, a line through the slot 38 extends to the other side of the axis of rotation of the induction disc 21 and the extension strip 42 is arranged substantially radially with respect to the axis of rotation of the induction disc. It is believed that this rotatable adjustment of the unshaded pole portion, the shaded pole portion and the extension strip operates to change the direction of the flux force applied to the induction disc and mechanically to change the spacing between the shaded and unshaded pole portions with respect to the tangent of a circle having its center at the axis of rotation of the induction disc. In any event, when the core is rotated to the position illustrated in Fig. 7, the torque and speed of rotation of the induction disc are decreased to a minimum. Accordingly, as the core 25 is rotatably positioned between the positions illustrated in Figs. 6 and 7 the speed of rotation of the induction disc 21 is correspondingly adjusted.

An alternating flux is produced in the core 25 by an exciting coil 44 mounted on the core 25 between the shading ring 39 and the front plate 15, this coil 44 being connected to a suitable source of alternating current. The back plate 11 is depressed inwardly as indicated at 45 adjacent the core 25 to aid in concentrating the flux passing through the induction disc 21. The flux path for the flux produced in the core 25 is completed through the frame including the back plate 11, the spacers 13 and the front plate 12, all of which are formed from magnetically permeable metal. Thus the motor frame also forms a part of the field structure which includes the core 25 and the coil 44. The lever 31 which rotatably positions the core 25 about its perpendicular axis for speed control purposes cooperates with indicia on the name plate 15 for indicating the rotative position of the core. This indicia, as shown in Fig. 1, includes the letters F and S which indicate a fast and slow speed operation.

As stated above, this variable speed single phase induction disc motor is particularly adaptable for operating switches or the like for electrical control purposes, and this is more particularly illustrated in Figs. 1 to 5. There a sub-plate 50 is arranged between the induction disc 21 and the front plate 12, and is secured in parallel spaced apart relation to the front plate 12 by means of spacers 51. The front plate 12 and the sub-plate 50 carry bearings 52 and 53 respectively and rotatably mounted in these bearings is a shaft 54. A collar 55 is secured to the shaft 54 and this collar carries a gear 56 meshing with the pinion gear teeth 20 on the shaft 19. Accordingly, as the shaft 19 is rotated the shaft 54 is rotated thereby at a speed determined by the gear reduction ratio between the pinion 20 and the gear 56. The collar 55 also carries a cam 57 having a desired high dwell and low dwell.

An insulating panel or terminal strip 60 is secured to the front plate 12 by screws 61, one of the screws 61 also holding the name plate in place. A bracket 62 is secured to the panel 60 by screws 63 and 64, the screw 64 forming a terminal connection. A leaf spring 65 is secured to the bracket 62 by screws 66 and 67 and it carries a contact member 68 which is provided with a pair of downwardly extending arms 69 which in turn carries a roller 70 engageable with the rotating cam 57. The free end of the contact member 68 carries a contact 71 which is adapted to engage and disengage a contact 72 carried by a bracket 73 secured to the terminal strip 60 by screws 74 and 75. The screw 75 also forms a terminal connection. A terminal 76 is also secured to the terminal strip 60. One line wire is secured to the terminal connection 64 and the neutral line wire is secured to the terminal 76. The exciting coil 44 for the motor is electrically connected to the screw 67 and hence to said one line wire and is also connected to the terminal 76 and hence to the neutral line wire. Thus, when electric energy is applied to the terminals 64 and 76, the exciting coil 44 is supplied with alternating current for operating the induction disc motor. A load circuit is connected to the terminal 75 and as the contacts 71 and 72 are opened and closed, the load circuit is correspondingly opened and closed, the contacts 71 and 72 being opened and closed by the cam 37 driven by the electric motor.

While for purposes of illustration one form of this invention has been disclosed. Other forms thereof may become apparent to those skilled in the art upon reference to this disclosure and, therefore, this invention is to be limited only by the scope of the appended claims.

I claim as my invention:

1. A variable speed single phase induction disc motor comprising, a rotatably mounted non-magnetic metallic induction disc, a field structure for the induction disc including a magnetically permeable metallic core arranged perpendicularly to the disc with its inner end adjacent the disc and including a coil arranged around the core for producing an alternating flux in the core, the inner end of the core being provided with a transverse slot, a non-magnetic metallic shading ring secured within the slot and encompassing a portion of the inner end of the core to form an unshaded pole portion and a shaded pole portion thereon for producing a rotating field for rotating the induction disc, a magnetically permeable metallic extension piece extending from the shaded pole portion at the inner end of the core beyond the shading ring and parallel to the induction disc for increasing the torque and speed of rotation of the induction disc, and means for adjustably mounting the core for rotatable adjustment about its perpendicular axis for rotatably positioning the unshaded pole portion, the shaded pole portion and the extension piece with respect to the axis of rotation of the induction disc for regulating the speed of rotation of the induction disc.

2. A variable speed single phase induction disc motor comprising, a rotatably mounted non-magnetic metallic induction disc, a field structure for the induction disc including a magnetically permeable metallic core arranged perpendicularly to the disc with its inner end adjacent the disc and including a coil arranged around the core for producing an alternating flux in the core, the inner end of the core being provided with a transverse slot, a non-magnetic metallic shading ring secured within the slot and encompassing a portion of the inner end of the core to form an unshaded pole portion and a shaded pole portion thereon for producing a rotating field for rotating the induction disc, a magnetically permeable metallic extension strip of greater length than it is wide extending lengthwise at an angle with respect to the slot from the shaded pole portion at the inner end of the core beyond the shading ring and parallel to the induction disc for increasing the torque and speed of rotation of the induction disc, and means for adjustably mounting the core for rotatable adjustment about its perpendicular axis for rotatably positioning the unshaded pole portion, the shaded pole portion and the extension strip with respect to the axis of rotation of the induction disc between a position where a line through the slot extends to one side of the axis of rotation of the induction disc and the extension strip is substantially tangential to a circle having its center at the axis of rotation of the induction disc and a position where a line through the slot extends to the other side of the axis of rotation of the induction disc and the extension strip is substantially radial with respect to the axis of rotation of the induction disc for regulating the speed of rotation of the induction disc.

3. A variable speed single phase induction disc motor comprising, a magnetically permeable frame including a pair of parallel plates and spacer members securing the plates in spaced parallel relation, a non-magnetic metallic disc arranged between the plates and in close parallel relationship to one of said plates, bearings carried by the plates, a shaft carrying the induction disc and rotatably mounted in the bearings for mounting the disc for rotation, a magnetically permeable metallic core perpendicularly carried by the other of said plates with its inner end closely adjacent the induction disc, a coil arranged around the core for producing an alternating flux in the core, the inner end of the core being provided with a transverse slot, a non-magnetic metallic shading ring secured within the slot and encompassing a portion of the inner end of the core to form an unshaded pole portion and a shaded pole portion thereon for producing a rotating field for rotating the induction disc, a magnetically permeable metallic extension piece extending from the shaded pole portion at the inner end of the core beyond the shading ring and parallel to the induction disc for increasing the torque and speed of rotation of the induction disc, and means for adjustably mounting the core on said other plate for rotatable adjustment about its perpendicular axis for rotatably positioning the unshaded pole portion, the shaded pole portion and the extension piece with respect to the axis of rotation of the induction disc for regulating the speed of rotation of the induction disc.

4. A variable speed single phase induction disc motor comprising, a magnetically permeable frame including a pair of parallel plates and spacer members securing the plates in spaced parallel relation, a non-magnetic metallic disc arranged between the plates and in close parallel relationship to one of said plates, bearings carried by the plates, a shaft carrying the induction disc and rotatably mounted in the bearings for mounting the disc for rotation, a magnetically permeable metallic core perpendicularly carried by the other of said plates with its inner end closely adjacent the induction disc, a coil arranged around the core for producing an alternating flux in the core, the inner end of the core being provided with a transverse slot, a non-magnetic metallic shading ring secured within the slot and encompassing a portion of the inner end of the core to form an unshaded pole portion and a shaded pole portion thereon for producing a rotating field for rotating the induction disc, a magnetically permeable metallic extension strip of greater length than it is wide extending lengthwise at an angle with respect to the slot from the shaded pole portion at the inner end of the core beyond the shading ring and parallel to the induction disc for increasing the torque and speed of rotation of the induction disc, and means for adjustably mounting the core on said other plate for rotatable adjustment about its perpendicular axis for rotatably positioning the unshaded pole portion, the shaded pole portion and the extension strip with respect to the axis of rotation of the induction disc between a position where a line through the slot extends to one side of the axis of rotation of the induction disc and a position where a line through the slot extends to the other side of the axis of rotation of the induction disc and the extension strip is substantially radial with respect to the axis of rotation of the induction disc for regulating the speed of rotation of the induction disc.

5. In an induction disc motor having a rotatably mounted non-magnetic metallic induction disc and a field structure including an exciting coil, a magnetically permeable metallic core arranged perpendicularly to the disc with its inner end adjacent the disc and a shading ring on the inner end of core dividing the same into an unshaded pole portion and a shaded pole portion for rotating the induction disc, a magnetically permeable metallic extension piece extending laterally from the shaded pole portion adjacent the induction disc for enhancing the torque and speed characteristics of the motor, and means for adjustably mounting the core for rotatably positioning the unshaded pole portion, the shaded pole portion and the extension piece with respect to the axis of rotation of the induction disc for regulating the speed of rotation of the induction disc.

6. In an induction disc motor having a rotatably mounted non-magnetic metallic induction disc and a field structure including an exciting coil, a magnetically permeable metallic core arranged perpendicularly to the disc with its inner end adjacent the disc and a shading ring on the inner end of core dividing the same into an unshaded pole portion and a shaded pole portion for rotating the induction disc, a magnetically permeable metallic extension strip of greater length than it is wide extending lengthwise laterally from the shaded pole portion adjacent the induction disc for enhancing the torque and speed characteristics of the motor, and means for adjustably mounting the core for rotatably positioning the unshaded pole portion, the shaded pole portion and the extension strip with respect to the axis of rotation of the induction disc between one position where maximum torque and speed are obtained and another position where minimum torque and speed are obtained for regulating the speed of rotation of the induction disc.

No references cited.